(12) United States Patent
Gueta et al.

(10) Patent No.: US 11,689,541 B2
(45) Date of Patent: *Jun. 27, 2023

(54) SYSTEM AND METHOD FOR DETECTING POTENTIAL INFORMATION FABRICATION ATTEMPTS ON A WEBPAGE

(71) Applicant: GLASSBOX LTD., Petah Tikva (IL)

(72) Inventors: Yaron Gueta, Hod Hasharon (IL); Roman Goldstain, Tel Aviv (IL); Roi Schragenheim, Kfar Yona (IL)

(73) Assignee: GLASSBOX LTD., Petah Tikva (IL)

( * ) Notice: Subject to any disclaimer, the term of this patent is extended or adjusted under 35 U.S.C. 154(b) by 253 days.

This patent is subject to a terminal disclaimer.

(21) Appl. No.: 17/073,357

(22) Filed: Oct. 18, 2020

(65) Prior Publication Data

US 2021/0136086 A1     May 6, 2021

Related U.S. Application Data

(60) Provisional application No. 62/930,594, filed on Nov. 5, 2019.

(51) Int. Cl.
  *H04L 9/40*       (2022.01)
  *G06F 16/958*    (2019.01)
  *G06F 9/54*       (2006.01)

(52) U.S. Cl.
  CPC .......... *H04L 63/123* (2013.01); *G06F 9/547* (2013.01); *G06F 16/958* (2019.01)

(58) Field of Classification Search
  CPC ....... H04L 63/123; G06F 16/958; G06F 9/547
  See application file for complete search history.

(56) References Cited

U.S. PATENT DOCUMENTS

| | | | | |
|---|---|---|---|---|
| 7,031,956 B1 * | 4/2006 | Lee | ........................ | G06F 16/986 |
| | | | | 707/E17.118 |
| 8,910,284 B1 * | 12/2014 | Erdmann | ............ | H04L 63/1416 |
| | | | | 709/224 |
| 9,438,625 B1 | 9/2016 | Yang | | |
| 2005/0278789 A1 * | 12/2005 | Wright | ................ | G06F 11/0793 |
| | | | | 714/E11.023 |
| 2012/0072492 A1 | 3/2012 | Aoki et al. | | |

(Continued)

FOREIGN PATENT DOCUMENTS

WO    WO2017210519    12/2017

OTHER PUBLICATIONS

4. Zaini, A. and Zainal, A., Jun. 2018—Exploiting Dom Mutation for the Detection of Ad-Injecting Browser Extension. In International Conference of Reliable Information and Communication Technology (pp. 657-669). Springer, Cham.

*Primary Examiner* — Ghodrat Jamshidi

(57) ABSTRACT

A method for detecting potential information fabrication attempt on a webpage, the method comprising: providing the webpage to a client device, by processing circuitry, the webpage comprising instructions executable by a web browser of the client device for detecting the potential information fabrication attempt; wherein execution of the instructions by the web browser results in: detecting the potential information fabrication attempt upon detecting a change in a Document Object Module (DOM) object of the webpage that is not based on execution of code by the webpage causing the change in the DOM object.

17 Claims, 4 Drawing Sheets

(56) References Cited

U.S. PATENT DOCUMENTS

| | | | |
|---|---|---|---|
| 2014/0325345 A1* | 10/2014 | Vano | G06F 40/103 |
| | | | 715/236 |
| 2015/0067861 A1* | 3/2015 | Foley | H04L 63/1425 |
| | | | 726/24 |
| 2016/0028742 A1* | 1/2016 | Johns | H04L 63/123 |
| | | | 726/26 |
| 2017/0257393 A1* | 9/2017 | De Barros | H04L 63/1416 |
| 2018/0052808 A1* | 2/2018 | Wan | G06F 16/9577 |
| 2018/0314676 A1* | 11/2018 | Lal | G06F 40/103 |
| 2019/0289085 A1* | 9/2019 | Miller | H04W 4/14 |
| 2020/0314588 A1* | 10/2020 | Kirwan | H04W 64/003 |
| 2020/0327175 A1* | 10/2020 | Stephenson | G06F 16/955 |
| 2020/0404491 A1* | 12/2020 | Sheng | H04W 12/33 |
| 2021/0103515 A1* | 4/2021 | Jiang | G06F 40/143 |

\* cited by examiner

SYSTEM AND METHOD FOR DETECTING POTENTIAL INFORMATION FABRICATION ATTEMPTS ON A WEBPAGE

TECHNICAL FIELD

The invention relates to a system and method for detecting potential information fabrication attempts on a webpage.

BACKGROUND

A vast amount of commercial activity nowadays is performed on-line, via websites offering products and/or services to visitors visiting such websites. Most users interact with the websites as expected, in a non-fraudulent manner. However, some make attempts to take advantage of the fact that the websites enable making transactions behind a curtain (without meeting an actual seller) and commit fraud.

A certain type of fraud is based on fraudulent users changing the content of the website after it is displayed on their device. A fraudulent user can, for example, can tamper with an object of the Document Object Model (DOM) representing a website displayed on such user's device to cause the web site to display information other than that such website is supposed to display according to the original website code. Thus, for example, a commerce website that is designed to display a certain product or service at a certain price can be fraudulently manipulated so as to display a different price. Another example is a website that displays information on stocks holdings of a user, which can be fraudulently manipulated to indicate as if the actual number of stocks held by such user is higher than the actual number held by such user.

Although such manipulations affect only the website's display on the user device, fraudulent users can, for example, purchase the product at the original price, capture a screenshot of their screen in which a manipulated and reduced price is shown, call a helpdesk of the website operator, and demand compensation for the allegedly overcharging, while showing the screenshot as evidence (fraudulently produced) of them being overcharged.

There is thus a need in the art for a new system and method for detecting potential information fabrication attempts on a webpage.

GENERAL DESCRIPTION

In accordance with a first aspect of the presently disclosed subject matter, there is provided a method for detecting potential information fabrication attempt on a webpage, the method comprising: providing the webpage to a user device, by processing circuitry, the webpage comprising instructions executable by a webpage accessing software of the user device for detecting the potential information fabrication attempt; wherein execution of the instructions by the webpage accessing software results in: detecting the potential information fabrication attempt upon detecting that a first size of a viewport divided by a second size of a window of the webpage accessing software on a display screen of the user device has been reduced, resulting in a scaled-down viewport on the display screen.

In some cases, the potential information fabrication attempt is detected also upon detecting a change in a Document Object Module (DOM) object of the webpage that is not based on execution of code by the webpage causing the change in the DOM object.

In some cases, a determination that the change in the DOM object is not based on execution of the code by the webpage is made by monitoring Application Programming Interface (API) calls that cause a change in the DOM object.

In some cases, the API calls include one or more of: CharacterData.replaceData, CharacterData.appendData, CharacterData.insertData, CharacterData.deleteData, CharacterData.data, Text.splitText, Node.textContent, Node.nodeValue, or Text.replaceWholeText.

In some cases, the potential information fabrication attempt is detected also upon detecting a call to a ToString function of a Document Object Module (DOM) object of the webpage.

In some cases, the execution of the instructions further results in providing an alert upon detecting the potential information fabrication attempt.

In some cases, the execution of the instructions further results in recording a web session of the user using the webpage.

In some cases, the method further comprises providing an alert as part of a replay of the recording upon detecting the potential information fabrication attempt within the web session.

In some cases, the method further comprises generating a report of potential information fabrication attempts, the report comprising indications of (a) the detected potential information fabrication attempt, and (b) additional detected potential information fabrication attempts detected on additional user devices.

In accordance with a second aspect of the presently disclosed subject matter, there is provided a system for detecting potential information fabrication attempt on a webpage, the system comprising processing circuitry configured to: provide the webpage to a user device, the webpage comprising instructions executable by a webpage accessing software of the user device for detecting the potential information fabrication attempt; wherein execution of the instructions by the webpage accessing software results in: detecting the potential information fabrication attempt upon detecting that a first size of a viewport divided by a second size of a window of the webpage accessing software on a display screen of the user device has been reduced, resulting in a scaled-down viewport on the display screen.

In some cases, the potential information fabrication attempt is detected also upon detecting a change in a Document Object Module (DOM) object of the webpage that is not based on execution of code by the webpage causing the change in the DOM object.

In some cases, a determination that the change in the DOM object is not based on execution of the code by the webpage is made by monitoring Application Programming Interface (API) calls that cause a change in the DOM object.

In some cases, the API calls include one or more of: CharacterData.replaceData, CharacterData.appendData, CharacterData.insertData, CharacterData.deleteData, CharacterData.data, Text.splitText, Node.textContent, Node.nodeValue, or Text.replaceWholeText.

In some cases, the potential information fabrication attempt is detected also upon detecting a call to a ToString function of a Document Object Module (DOM) object of the webpage.

In some cases, the execution of the instructions further results in providing an alert upon detecting the potential information fabrication attempt.

In some cases, the execution of the instructions further results in recording a web session of the user using the webpage.

In some cases, the processing circuitry is further configured to provide an alert as part of a replay of the recording upon detecting the potential information fabrication attempt within the web session.

In some cases, the processing circuitry is further configured to generate a report of potential information fabrication attempts, the report comprising indications of (a) the detected potential information fabrication attempt, and (b) additional detected potential information fabrication attempts detected on additional user devices.

In accordance with a third aspect of the presently disclosed subject matter, there is provided a non-transitory computer readable storage medium having computer readable program code embodied therewith, the computer readable program code, executable by processing circuitry of a computer to perform a method for detecting potential information fabrication attempt on a webpage, the method comprising: providing the webpage to a user device, by processing circuitry, the webpage comprising instructions executable by a webpage accessing software of the user device for detecting the potential information fabrication attempt; wherein execution of the instructions by the webpage accessing software results in: detecting the potential information fabrication attempt upon detecting that a first size of a viewport divided by a second size of a window of the webpage accessing software on a display screen of the user device has been reduced, resulting in a scaled-down viewport on the display screen.

In accordance with a fourth aspect of the presently disclosed subject matter, there is provided a method for detecting potential information fabrication attempt on a webpage, the method comprising: providing the webpage to a client device, by processing circuitry, the webpage comprising instructions executable by a web browser of the client device for detecting the potential information fabrication attempt; wherein execution of the instructions by the web browser results in: detecting the potential information fabrication attempt upon detecting a change in a Document Object Module (DOM) object of the webpage that is not based on execution of code by the webpage causing the change in the DOM object.

In some cases, the potential information fabrication attempt is detected also upon detecting that a first size of a viewport divided by a second size of a window of the web browser on a display screen of the client device has been reduced, resulting in a scaled-down viewport on the display screen.

In some cases, a determination that the change in the DOM object is not based on execution of the code by the webpage is made by monitoring Application Programming Interface (API) calls that cause a change in the DOM object.

In some cases, the API calls include one or more of: CharacterData.replaceData, CharacterData.appendData, CharacterData.insertData, CharacterData.deleteData, CharacterData.data, Text.splitText, Node.textContent, Node.nodeValue, or Text.replaceWholeText.

In some cases, the potential information fabrication attempt is detected also upon detecting a call to a ToString function of a Document Object Module (DOM) object of the webpage.

In some cases, the execution of the instructions further results in providing an alert upon detecting the potential information fabrication attempt.

In some cases, the execution of the instructions further results in recording a web session of the user using the webpage.

In some cases, the method further comprises providing an alert as part of a replay of the recording upon detecting the potential information fabrication attempt within the web session.

In some cases, the method further comprises generating a report of potential information fabrication attempts, the report comprising indications of (a) the detected potential information fabrication attempt, and (b) additional detected potential information fabrication attempts detected on additional client devices.

In accordance with a fifth aspect of the presently disclosed subject matter, there is provided a system for detecting potential information fabrication attempt on a webpage, the system comprising processing circuitry configured to: provide the webpage to a client device, the webpage comprising instructions executable by a web browser of the client device for detecting the potential information fabrication attempt;

wherein execution of the instructions by the web browser results in: detecting the potential information fabrication attempt upon detecting a change in a Document Object Module (DOM) object of the webpage that is not based on execution of code by the webpage causing the change in the DOM object.

In some cases, the potential information fabrication attempt is detected also upon detecting that a first size of a viewport divided by a second size of a window of the web browser on a display screen of the client device has been reduced, resulting in a scaled-down viewport on the display screen.

In some cases, a determination that the change in the DOM object is not based on execution of the code by the webpage is made by monitoring Application Programming Interface (API) calls that cause a change in the DOM object.

In some cases, the API calls include one or more of: CharacterData.replaceData, CharacterData.appendData, CharacterData.insertData, CharacterData.deleteData, CharacterData.data, Text.splitText, Node.textContent, Node.nodeValue, or Text.replaceWholeText.

In some cases, the potential information fabrication attempt is detected also upon detecting a call to a ToString function of a Document Object Module (DOM) object of the webpage.

In some cases, the execution of the instructions further results in providing an alert upon detecting the potential information fabrication attempt.

In some cases, the execution of the instructions further results in recording a web session of the user using the webpage.

In some cases, the processing circuitry is further configured to provide an alert as part of a replay of the recording upon detecting the potential information fabrication attempt within the web session.

In some cases, the processing circuitry is further configured to generate a report of potential information fabrication attempts, the report comprising indications of (a) the detected potential information fabrication attempt, and (b) additional detected potential information fabrication attempts detected on additional client devices.

In accordance with a sixth aspect of the presently disclosed subject matter, there is provided a non-transitory computer readable storage medium having computer readable program code embodied therewith, the computer readable program code, executable by processing circuitry of a computer to perform a method for detecting potential information fabrication attempt on a webpage, the method comprising: providing the webpage to a client device, by processing circuitry, the webpage comprising instructions executable by a web browser of the client device for detecting the potential information fabrication attempt; wherein execution of the instructions by the web browser results in: detecting the potential information fabrication attempt upon detecting a change in a Document Object Module (DOM) object of the webpage that is not based on execution of code by the webpage causing the change in the DOM object.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
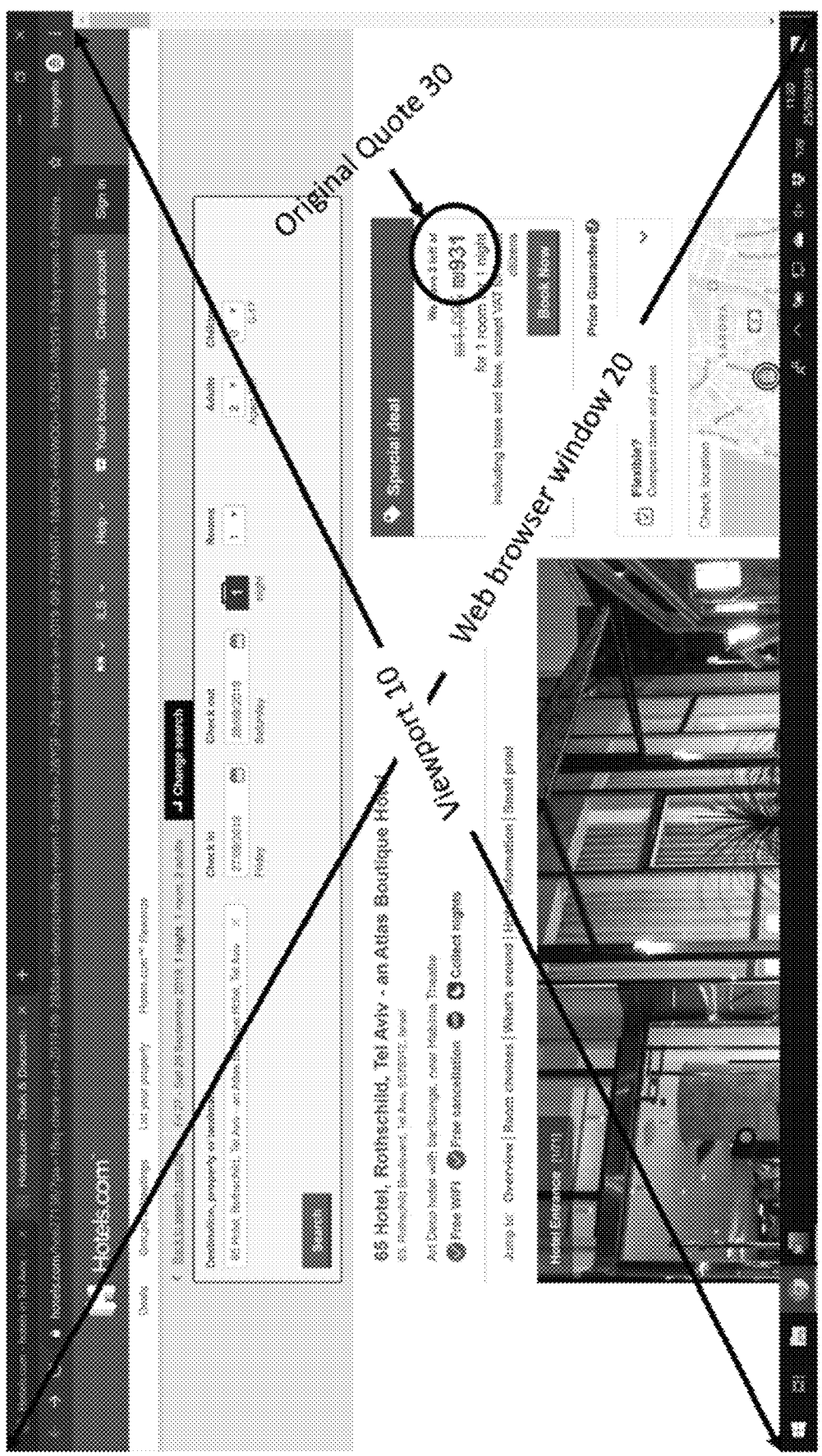
FIGS. 1a, 1b and 1c are screenshot exemplifying an information fabrication attempt made using DevTools.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "detecting", "checking", "recording", "generating" or the like, include action and/or processes of a computer that manipulate and/or transform data into other data, said data represented as physical quantities, e.g. such as electronic quantities, and/or said data representing the physical objects. The terms "computer", "processor", "processing resource", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
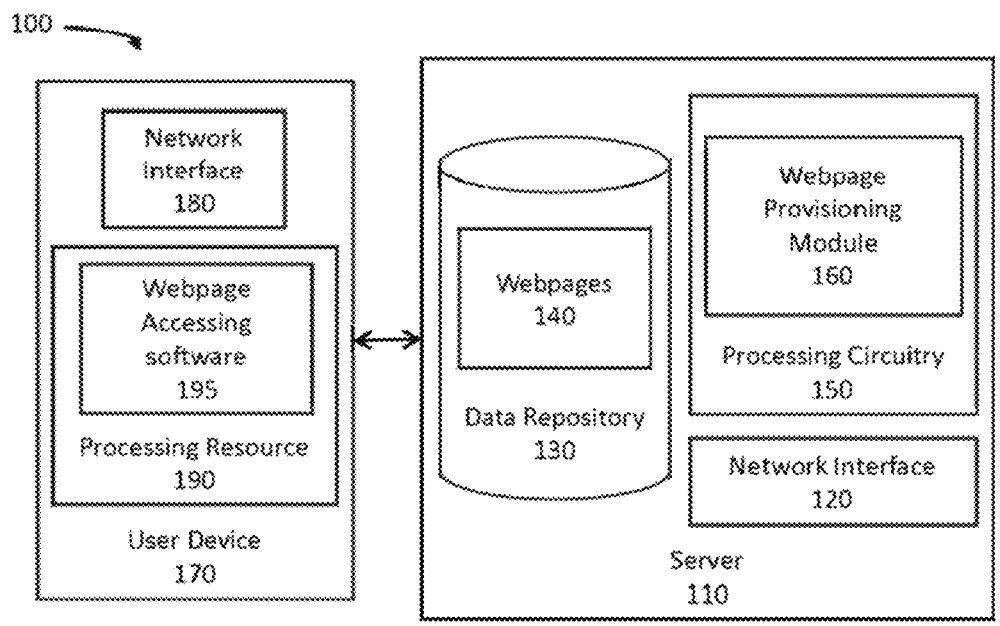
FIG. 2 is a block diagram schematically illustrating one example of a system for detecting potential information fabrication attempts on a webpage, in accordance with the presently disclosed subject matter.
Figure 3:
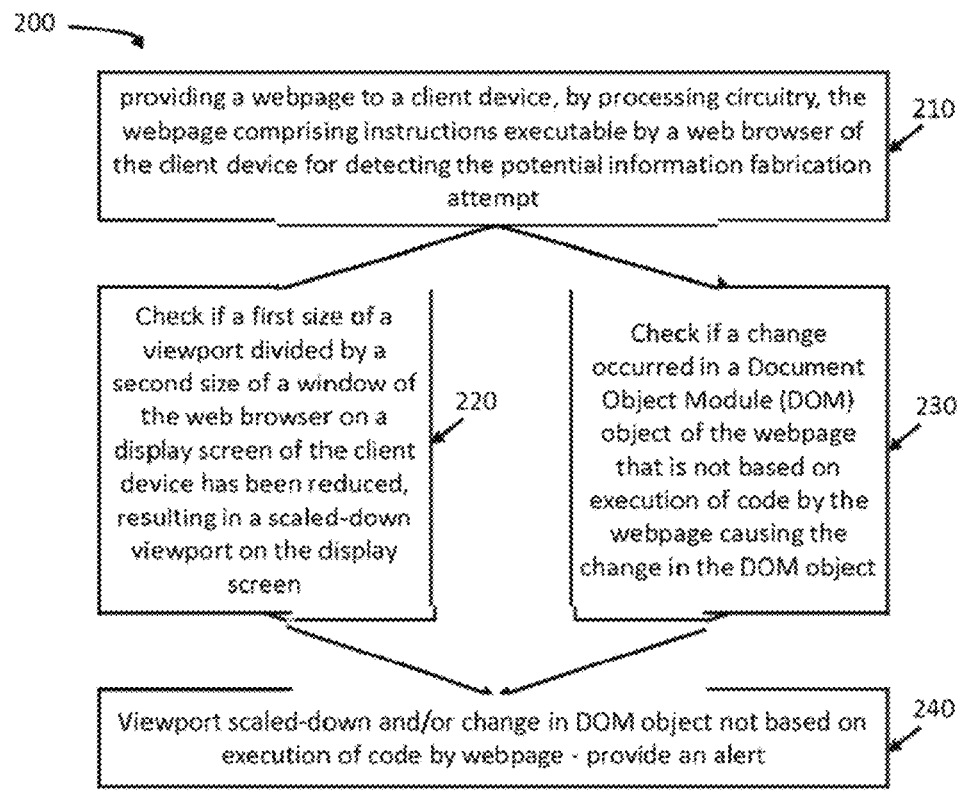
FIG. 3 is a flowchart illustrating one example of a sequence of operations carried out for detecting potential information fabrication attempts on a webpage, in accordance with the presently disclosed subject matter.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIG. 2 illustrates a general schematic of the system architecture in accordance with an embodiment of the presently disclosed subject matter. Some of the modules in FIG. 2 can be made up of combinations of software, hardware and/or firmware that performs the functions as defined and explained herein. Some of the modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 1B:
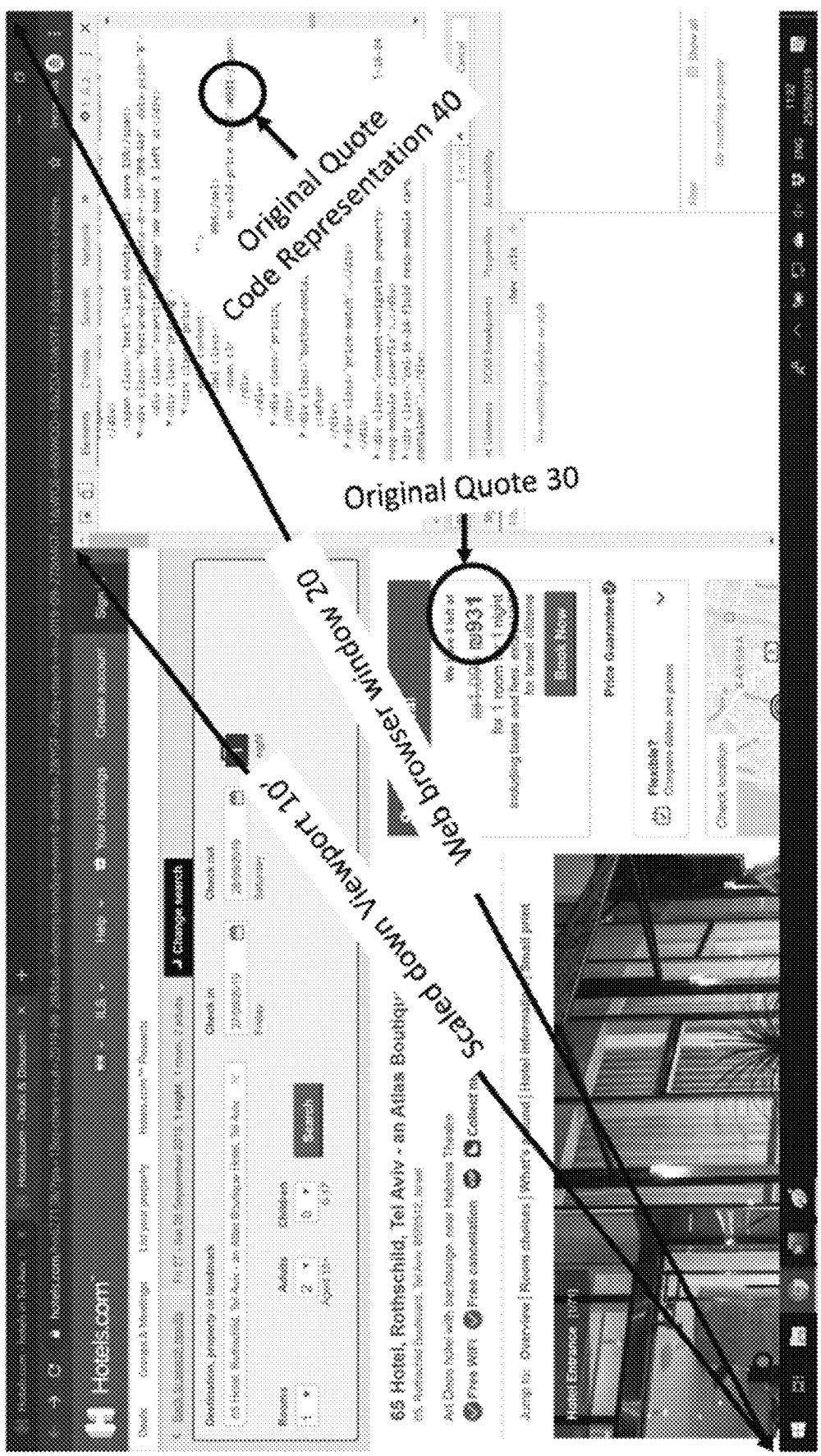
Figure 1C:
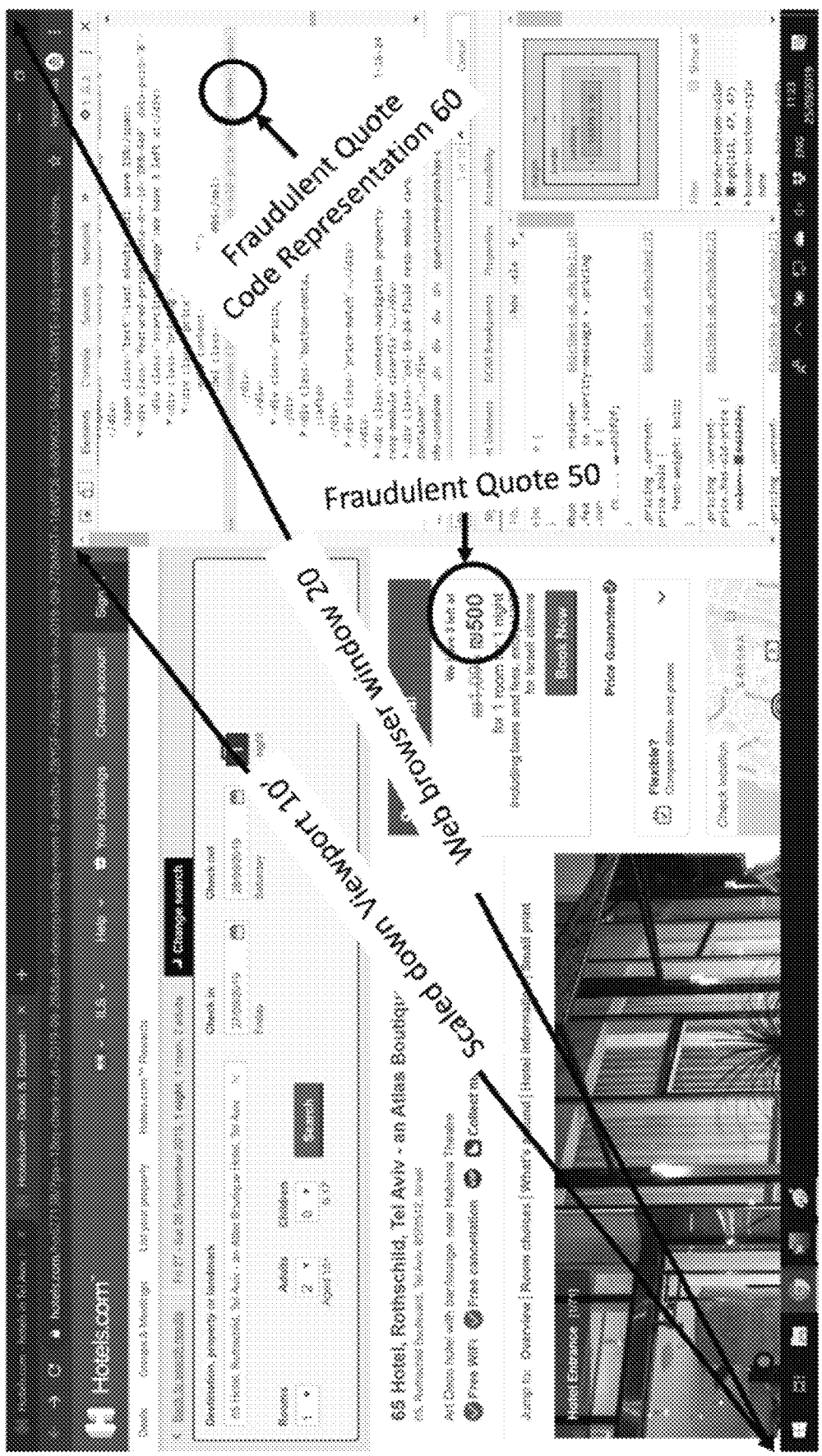

Bearing this in mind, attention is drawn to FIGS. 1a-1c, showing exemplary screenshots exemplifying an information fabrication attempt made using DevTools.

FIG. 1a shows a screenshot of a webpage of the website "Hotels.com™" providing an offer for a hotel room, within a viewport 10 of a web-browser window 20. Web-browser window 20 is a window of a web-browser software executing on a user device (e.g. a computer, a smartphone, or any other device capable of executing web-browser software enabling display of websites thereon. The viewport 10 is a sub-portion of the web-browser window 20 on which the website is displayed. The exemplary webpage shown in the figure provides an original quote 30 in the sum of 931 New Israeli Shekels (NIS) for booking the room.

In FIG. 1*b*, a screenshot of the same webpage is shown, after a user viewing the webpage in the user's device opens DevTools, e.g. by clicking the "F12" button or a combination of "Ctrl"+"Shift"+"C". DevTools provides the code representing the webpage displayed on the web-browser in an editable manner, so that the webpage can be manipulated while it is displayed to the user.

Opening DevTools results in the viewport 10 being scaled down to scaled down viewport 10' in light of the fact that the DevTools portion is now displayed within the web-browser window 20. At this stage, the original quote 30 is still in the sum of 931 NIS for booking the room, and the DevTools displays the original quote code representation 40, which is the code representing the original quote 30. As can be seen, the original quote code representation 40 includes the representation of the original quote 30 which is 931 NIS, as planned in accordance with the original webpage code.

Turning to FIG. 1*c*, the user viewing the webpage on the user's device, changes the representation of the original quote 30 (which is 931 NIS) shown in FIG. 1*b*, to a fraudulent quote representation 60 by changing the text "₪ 931" to "₪ 500", which results in the original quote 30 being replaced by a fraudulent quote 50 indicating that the cost of booking the room is only 500 NIS, instead of the original quote of 931 NIS.

At this stage, the user can capture a screenshot of the webpage including the fraudulent quote 50, and after placing the order, the user can call the website's customer support and argue that he/she was overcharged, with the screenshot serving as evidence.

It is to be noted that changes to the website's code can be made also in other manners, and DevTools is only one example.

Having described the information fabrication attempt made using DevTools, attention is now drawn to FIG. 2, showing a block diagram schematically illustrating one example of a system for detecting potential information fabrication attempts on a webpage, in accordance with the presently disclosed subject matter.

In accordance with the presently disclosed subject matter, system 100 can include at least one server 110 and at least one user device 170.

Server 110 can be a web server that is configured to provide webpages 140 to user device 170, thereby enabling at least one user of user device 170 to interact with the webpages 140. The user can interact with each of the webpages 140 using webpage accessing software 195 that is installed on user device 170 and that displays the webpages 140 on user device 170. In some cases, webpage accessing software 195 can be a web browser (i.e. a wide purpose application used for browsing websites in order for a user of user device 170 to view and interact with webpages), a web based application (i.e. a dedicated application used to browse specific webpages) or similar applications used to view webpages during a web browsing session.

In accordance with the presently disclosed subject matter, server 110 can comprise a network interface 120 (e.g. a network card, a WiFi client, a LiFi client, 3G/4G client, or any other component), enabling server 110 to communicate over a network with one or more user devices (e.g. user device 170), web-session recording units, etc.

Server 110 can further comprise, or be otherwise associated with, a data repository 130 (e.g. a database, a storage system, a memory including Read Only Memory—ROM, Random Access Memory—RAM, or any other type of memory, etc.) configured to store data, including, inter alia, the webpages 140, web browsing sessions, etc. In some cases, data repository 130 can be further configured to enable retrieval and/or update and/or deletion of the data stored thereon. It is to be noted that in some cases, data repository 130 can be distributed.

Server 110 further comprises processing circuitry 150. Processing circuitry 150 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant resources of server 110 and for enabling operations related to system resources of server 110.

Processing circuitry 150 comprises a webpage provisioning module 160. Webpage provisioning module 160 can be configured to provide one or more of the webpages 140 to one or more user devices 170. In some cases, the webpages 140 can include code whose execution on the user device 170 results in detection of potential information fabrication attempts and optionally also recording of the user's interaction with the webpage 140 over the user device 170.

Turning to user device 170, it is to be noted that it can be a computation device (e.g. a desktop computer, a laptop, a smartphone, a tablet, etc.) on which webpage accessing software 195 is installed. Webpage accessing software 195 can be configured to execute the instructions that are comprised within the webpage 140 for detection of potential information fabrication attempts and optionally also recording of the user's interaction with the webpage 140 over the user device 170.

In accordance with the presently disclosed subject matter, user device 170 can comprise a network interface 180 (e.g. a network card, a WiFi client, a LiFi client, 3G/4G client, or any other component), enabling user device 170 to communicate over a network with one or more servers 110 (directly or indirectly), etc.

User device 170 further comprises processing circuitry 190. Processing circuitry 190 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant resources of user device 170 and for enabling operations related to system resources of user device 170.

Processing circuitry 190 comprises webpage accessing software 195 configured to obtain a webpage 140 comprising instructions executable by webpage accessing software 195 of user device 170 for detecting potential information fabrication attempts and optionally also recording of the user's interaction with the webpage 140 over the user device 170. Webpage accessing software 195 can be further configured to execute the instructions, as detailed further herein, inter alia with reference to FIG. 3.

Turning to FIG. 3, there is shown a flowchart illustrating one example of a sequence of operations carried out for detecting potential information fabrication attempts on a webpage, in accordance with the presently disclosed subject matter.

According to certain examples of the presently disclosed subject matter, server 110 and user device 170 can be configured to perform a potential information fabrication attempt detection process 200, e.g. utilizing webpage provisioning module 160 and webpage accessing software 195, respectively.

For this purpose, server 110 provides, directly, or indirectly, a webpage 140 to the user device 170 (which obtains the webpage from the server 110, directly, or indirectly) (block 210). The webpage 140 comprises instructions executable by webpage accessing software 195 (e.g. a web browser) of the user device 170 for detecting potential information fabrication attempts.

Upon execution of the instructions comprised in the webpage 140, the user device 170 monitors: (a) if a first size of a viewport divided by a second size of a window of the webpage accessing software on a display screen of the user device has been reduced, resulting in a scaled-down viewport on the display screen (block 220), and/or (b) if a change occurred in a Document Object Module (DOM) object of the webpage that is not based on execution of code by the webpage causing the change in the DOM object (block 230).

A check if the viewport has been scaled down can be made at various points in time. The first is when loading a webpage, and the second is whenever the viewport 10 is resized. Clearly, DevTools can be open before the user enters the webpage 140. Accordingly, when loading the webpage, it is desirable to check if there is a likelihood that the DevTools is open. This can be achieved by comparing the viewport's 10 size with the web-browser window 20 size. In case the viewport's 10 width and/or height is lower than the web-browser window 20 width and/or height, respectively, by over a threshold (e.g. 25%), a determination can be made that the viewport 10 has been scaled down prior to loading of the webpage 140. The same check can be performed whenever the viewport is resized in order to identify that the viewport 10 has been scaled down after the webpage has been loaded.

A determination that the change in the DOM object is not based on execution of the code by the webpage can be made by monitoring Application Programming Interface (API) calls that cause a change in the DOM object. In order to identify fraudulent attempts to temper with the DOM, it is required to identify when the DOM changes, and who caused such DOM change (whether it is the webpage itself, which is normal during execution of code thereby, or if it is a result of an external entity tampering with the DOM).

Detecting changes to the DOM can be made using MutationObserver which enables identifying DOM changes. The determination as to who made triggered such DOM changes requires adding hooks to API calls (including one or more of: CharacterData.replaceData, CharacterData.appendData, CharacterData.insertData, CharacterData.deleteData, CharacterData.data, Text.splitText, Node.textContent, Node.nodeValue, or Text.replaceWholeText), which are used in natural operation of the webpage for changing the DOM. Such hooks can be used for validating DOM changes, so that if the DOM changed, and the hooks indicate that the change is a result of operation of such valid API calls—the changes are valid and non-fraudulent. However, if the DOM changed, and the hooks were not triggered, the change to the DOM is not a result of natural operation of the webpage, and is thus, potentially fraudulent.

It is to be noted that in some cases only one of blocks 220 or 230 is performed, whereas in other cases both block 220 and block 230 are performed.

In some cases, in addition to performing block 220, calls to a ToString function of a Document Object Module (DOM) object of the webpage are also monitored. Such functions are only likely to be called when a user tampers with the DOM via DevTools, and accordingly, identifying a call to a ToString function can reinforce the likelihood of fraudulent DOM tampering.

In some cases, upon at least one of the checks performed at block 220 or block 230 resulting in a positive result (i.e. (a) a first size of a viewport divided by a second size of a window of the webpage accessing software on a display screen of the user device has been reduced, resulting in a scaled-down viewport on the display screen, or (b) a change occurred in a Document Object Module (DOM) object of the webpage that is not based on execution of code by the webpage causing the change in the DOM object), an alert can be provided to the server 110 (block 240). Such alert can be provided by the server to a user thereof, that can investigate the alert.

In some cases, in order for an alert to be provided due to a positive result at block 220, a call to a ToString function has to be identified as well to reinforce the likelihood of fraudulent DOM tampering. In other cases, a likelihood score can be assigned to the alert, and the score is higher if a call to a ToString function is identified in addition to a positive result at block 220.

In some cases, execution of the instructions comprised within the webpage 140 further results in recording a web session of the user using the webpage 140, e.g. using known methods and/or techniques. In such cases, providing the alert can be as part of a replay of the recording upon detecting the potential information fabrication attempt within the web session. In this case, upon a customer support representative reviewing the user's web session, an indication of a potential information fabrication attempt can be provided thereto.

In some cases, the server 110 can be further configured to generate a report of potential information fabrication attempts. The report can comprise indications of (a) the detected potential information fabrication attempt, and (b) additional detected potential information fabrication attempts detected on additional user devices.

It is to be noted that, with reference to FIG. 3, some of the blocks can be integrated into a consolidated block or can be broken down to a few blocks and/or other blocks may be added. Furthermore, in some cases, the blocks can be performed in a different order than described herein (for example, block 230 can be performed before block 240, etc.). It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A method for detecting potential information fabrication attempt on a webpage, the method comprising:
   providing the webpage to a client device, by processing circuitry, the webpage comprising instructions executable by a web browser of the client device for detecting the potential information fabrication attempt;
   wherein execution of the instructions by the web browser results in:
   detecting the potential information fabrication attempt upon detecting a change in a Document Object Module (DOM) object of the webpage that is not based on execution of code by the webpage causing the change in the DOM object; and
   generating a report of potential information fabrication attempts, the report comprising indications of (a) the detected potential information fabrication attempt, and (b) additional detected potential information fabrication attempts detected on additional client devices.

2. The method of claim 1, wherein the potential information fabrication attempt is detected also upon detecting that a first size of a viewport divided by a second size of a window of the web browser on a display screen of the client device has been reduced, resulting in a scaled-down viewport on the display screen.

3. The method of claim 2, wherein the potential information fabrication attempt is detected also upon detecting a call to a ToString function of a Document Object Module (DOM) object of the webpage.

4. The method of claim 1, wherein a determination that the change in the DOM object is not based on execution of the code by the webpage is made by monitoring Application Programming Interface (API) calls that cause a change in the DOM object.

5. The method of claim 4, wherein the API calls include one or more of: CharacterData.replaceData, CharacterData.appendData, CharacterData.insertData, CharacterData.deleteData, CharacterData.data, Text.splitText, Node.textContent, Node.nodeValue, or Text.replaceWholeText.

6. The method of claim 1, wherein the execution of the instructions further results in providing an alert upon detecting the potential information fabrication attempt.

7. The method of claim 1, wherein the execution of the instructions further results in recording a web session of the user using the webpage.

8. The method of claim 7, further comprising providing an alert as part of a replay of the recording upon detecting the potential information fabrication attempt within the web session.

9. A system for detecting potential information fabrication attempt on a webpage, the system comprising processing circuitry configured to:
   provide the webpage to a client device, the webpage comprising instructions executable by a web browser of the client device for detecting the potential information fabrication attempt;
   wherein execution of the instructions by the web browser results in:
   detecting the potential information fabrication attempt upon detecting a change in a Document Object Module (DOM) object of the webpage that is not based on execution of code by the webpage causing the change in the DOM object; and
   generating a report of potential information fabrication attempts, the report comprising indications of (a) the detected potential information fabrication attempt, and (b) additional detected potential information fabrication attempts detected on additional client devices.

10. The system of claim 9, wherein the potential information fabrication attempt is detected also upon detecting that a first size of a viewport divided by a second size of a window of the web browser on a display screen of the client device has been reduced, resulting in a scaled-down viewport on the display screen.

11. The system of claim 10, wherein the potential information fabrication attempt is detected also upon detecting a call to a ToString function of a Document Object Module (DOM) object of the webpage.

12. The system of claim 9, wherein a determination that the change in the DOM object is not based on execution of the code by the webpage is made by monitoring Application Programming Interface (API) calls that cause a change in the DOM object.

13. The system of claim 12, wherein the API calls include one or more of: CharacterData.replaceData, CharacterData.appendData, CharacterData.insertData, CharacterData.deleteData, CharacterData.data, Text.splitText, Node.textContent, Node.nodeValue, or Text.replaceWholeText.

14. The system of claim 9, wherein the execution of the instructions further results in providing an alert upon detecting the potential information fabrication attempt.

15. The system of claim 9, wherein the execution of the instructions further results in recording a web session of the user using the webpage.

16. The system of claim 15, wherein the processing circuitry is further configured to provide an alert as part of a replay of the recording upon detecting the potential information fabrication attempt within the web session.

17. A non-transitory computer readable storage medium having computer readable program code embodied therewith, the computer readable program code, executable by processing circuitry of a computer to perform a method for detecting potential information fabrication attempt on a webpage, the method comprising:
   providing the webpage to a client device, by processing circuitry, the webpage comprising instructions executable by a web browser of the client device for detecting the potential information fabrication attempt;
   wherein execution of the instructions by the web browser results in:
   detecting the potential information fabrication attempt upon detecting a change in a Document Object Module (DOM) object of the webpage that is not based on execution of code by the webpage causing the change in the DOM object; and
   generating a report of potential information fabrication attempts, the report comprising indications of (a) the detected potential information fabrication attempt, and (b) additional detected potential information fabrication attempts detected on additional client devices.

* * * * *